United States Patent [19]

Roman

[11] Patent Number: 4,740,296

[45] Date of Patent: Apr. 26, 1988

[54] HOUSEHOLD WATER FILTER SYSTEM

[76] Inventor: Michael H. Roman, 18 Eugene St., Lowville, N.Y. 13367

[21] Appl. No.: 935,823

[22] Filed: Nov. 28, 1986

[51] Int. Cl.$^4$ .................... B01D 23/10; B01D 27/04
[52] U.S. Cl. ............................ 210/94; 210/314; 210/416.3; 210/287
[58] Field of Search ............... 210/94, 264, 266, 282, 210/284, 287, 314, 316, 416.3, 435, 460

[56] References Cited

U.S. PATENT DOCUMENTS

| | | | |
|---|---|---|---|
| 3,561,602 | 2/1971 | Molitor | 210/266 |
| 3,763,879 | 10/1973 | Jaworek | 210/266 |
| 3,815,752 | 6/1974 | Hoffman et al. | 210/266 |
| 3,841,490 | 10/1974 | Hoffman et al. | 210/282 |
| 4,340,470 | 7/1982 | Van Mol | 210/94 |
| 4,368,123 | 1/1983 | Stanley | 210/282 |
| 4,595,500 | 6/1986 | Galbiati | 210/266 |

*Primary Examiner*—Richard V. Fisher
*Assistant Examiner*—Wanda L. Millard
*Attorney, Agent, or Firm*—Charles S. McGuire

[57] ABSTRACT

A portable water filter for household use is disclosed, comprising a pair of releasably connected, upper and lower sections. A water faucet is connected by a line having a severe flow restriction to the lower section for discharge into the bottom thereof. The two sections are connected by a threaded collar having an integral wall separating the two sections with aperture means at its center for upward flow of water from the lower to the upper section. Each section contains two filtering materials, one of which in each section is a plurality of nested, cup-shaped, paper filter elements sealed by a mating ring to the interior surface of the respective section. The walls of the sections are transparent to permit viewing of the filter materials, thereby visually indicating the need for filter replacement by the degree of discoloration thereof.

10 Claims, 1 Drawing Sheet

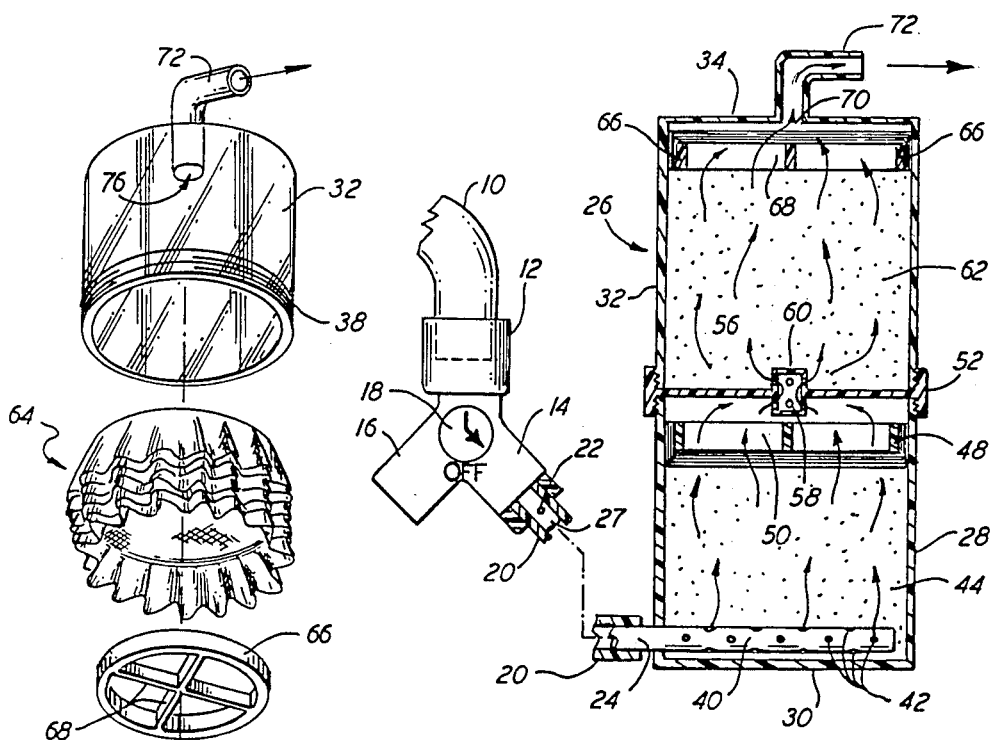
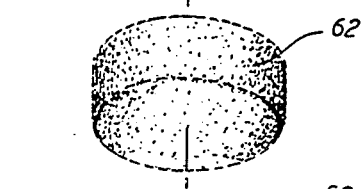
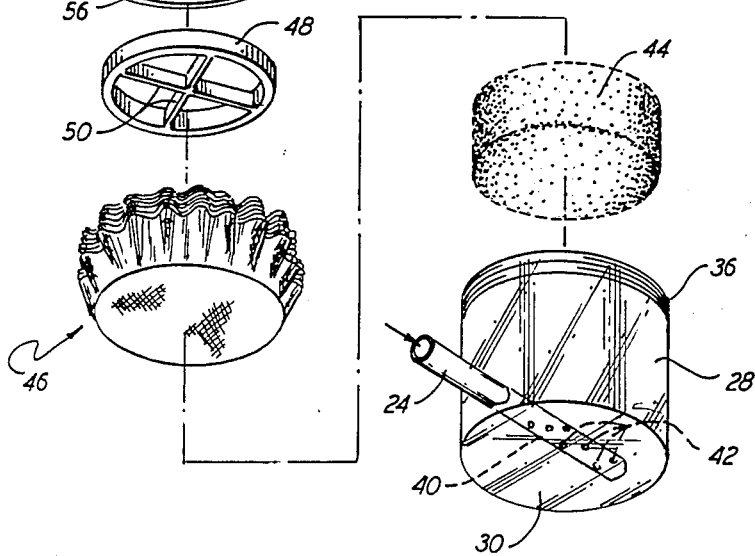
FIG. 1
FIG. 2

HOUSEHOLD WATER FILTER SYSTEM

BACKGROUND OF THE INVENTION

The present invention relates to water filtering apparatus, and more specifically to a water filter system for attachment to a household faucet, or the like, for filtering water at a relatively slow rate.

The prior art includes a number of forms of filtering apparatus intended for connection to a household water faucet to remove impurities and foreign matter. Systems of this type often operate at line pressure to obtain a flow rate out of the filter approximately equal to that which would come out of the faucet at such pressure. In systems of the reverse osmosis type, water under no appreciable pressure migrates through a layer of filter material. In general, there is a trade-off between filtering efficiency, i.e., the degree of purity of the filtered water, and the rate of flow out of the filtering system.

It is a principal object of the present invention to provide a water filtering system which has a high filtering efficiency, for connection to a household faucet but operates under positive pressure to provide filtered water at an acceptable flow rate.

A further object is to provide low cost water filtering apparatus for household use which is simple in operation and construction, permitting fast and easy installation, as well as replacement of inexpensive, expandable filter material.

Another object is to provide apparatus for filtering household tap water wherein expendable filter material is directly visible to indicate visually the need for replacement thereof.

SUMMARY OF THE INVENTION

The filtering system of the invention includes a pair of cylindrical sections which are detachably connected in vertical relation to provide an upper and a lower section. A line connected at one end to a household water faucet discharges at the opposite end through a plurality of openings arranged near the bottom of the lower section. A severe flow restriction in this line reduces the pressure of the water entering the lower section of the filter apparatus to a fraction of the line pressure at the faucet, e.g., 10% or less.

The lower and upper sections are preferably connected by a threaded collar and are separated by an impermeable wall, which may be formed integrally with the collar. Water passes upwardly from the lower to the upper section through aperture means in the wall, preferably at the center. Both the lower and the upper sections have dual filtering means, e.g., a layer of material such as activated carbon and multiple layers of paper filters. Retaining rings are provided to engage the paper filters tightly with the inner surfaces of the lower and upper sections. Filtered water exits the filter apparatus through an opening in the top of the upper section.

BRIEF DESCRIPTION OF THE DRAWING

FIG. 1 is a front elevational view of the filter apparatus in vertical section, shown with a faucet from which water is supplied, with an adapter for connecting the faucet to the filter apparatus; and FIG. 2 is an exploded perspective view of the filter apparatus.

DETAILED DESCRIPTION

Referring now to the drawing, in FIG. 1 is shown a fragment of a conventional, household, water faucet 10. Connected to the outlet of faucet 10 by threaded or friction fit coupling 12 is a Y-shaped fitting having branches 14 and 16 and a valve with manually positionable control knob 18. An arrow or other such indicia on control knob 18 indicates the position of the valve, e.g., in the position shown in FIG. 1 the valve is positioned for flow of water from faucet 10 through branch 14. Turning knob 18 45° in a clockwise direction will position the valve to block all flow from the faucet, and turning it 90° will permit flow from the faucet through branch 16.

Branch 14 of the fitting is connected by a suitable length of flexible tubing 20, preferably of rubber or plastic, is connected at one end to nipple 22 extending from branch 14, and at the other end to nipple 24, extending outwardly from the lower end of the filtering apparatus, indicated generally by reference numeral 26. If desired, the nipples may be of the barbed type to provide more secure connections for the ends of tubing 20. Small orifice 27 provides a severe restriction, e.g., on the order of 90% to 95%, in the flow of water from faucet 10 through tubing 20 and consequently a low pressure within apparatus 26.

Filter apparatus 26 includes lower section 28 having closure wall 30 on the bottom, and upper section 32 having closure wall 34 on the top. Sections 28 and 32 are illustrated as cylindrical in shape, but may be of other configurations so long as they may be interconnected with one above the other. For purposes of interconnection, lower and upper sections 28 and 32 are externally threaded at their upper and lower ends, respectively, as indicated at 36 and 38 in FIG. 2. Nipple 24 extends through the side wall of lower section 28 and is integrally connected to tube 40 having a plurality of openings 42 arranged within section 28 adjacent to bottom wall 30 thereof.

Immediately above tube 40 in lower section 28 is a quantity of a first filtering material 44, preferably activated carbon, or the like, extending completely across the interior of section 28 so that all water which enters through tube 40 must pass upwardly through material 44. Second filtering material 46 is arranged within section 28 above material 44. In the preferred embodiment, material 46 is comprised of a plurality of layers of conventional paper filtering material such as the filters commonly used in drip coffee makers. For example, about six such filters may be utilized in the nested, cup-shaped configuration in which they may be commercially obtained, to provide filtering material 46. Ring 48, having crossed reinforcing members 50, has a diameter such that it may be pressed into the open, upper end of section 28 with the peripheral edges of the filters which form material 46 frictionally engaged between the ring and the inside surface of section 28. This forms an effective seal, insuring that all water which flows upwardly within section 28 passes through filter material 46, and does not seep around the edges thereof. A second or more ring sets of filters may be inserted over the first ring set of filters.

Lower and upper sections 28 and 32 are interconnected by threaded collar 52 and separated by impermeable wall 54 which may be integrally formed with the collar. Short, tubelike member 56 passes through the central portion of wall 54 to extend outwardly on each side thereof. Member 56 is closed on both ends and includes openings 58 and 60 in its side wall on opposite sides of wall 54.

A pair of filtering materials are also disposed within upper section 32. The first of such materials, indicated by reference numeral 62, is preferably a mass of loosely packed synthetic or natural fibers, in the nature of a floss, or other bulk material useful in liquid filtration. The second filter material 64 in upper section 32 may be the same type of nested paper filters used in lower section 28, and are likewise retained in position and sealed about their periphery by ring 66 having crossed reinforcing members 68. Rings 48 and 66, and/or the side walls of sections 28 and 32, may be tapered slightly to accommodate more easily the frictional fit of the rings within the sections, with the edges of the paper filters engaged therebetween.

From the foregoing it may be seen that when faucet 10 is open and control knob 18 is positioned to direct flow through branch 14, water will enter lower section 28 of filter apparatus 26, being distributed along the lower side thereof by tube 40, after having been considerably reduced in pressure by flow restriction 27. As apparatus 26 fills, water flows upwardly in lower section 28, through first and second filter materials 44 and 46, and thence through openings 58 and 60 into upper section 32. As the water continues to flow upwardly within section 32 it passes through the first and second filter materials 62 and 64 of this section, and exits apparatus 26 through opening 70 in top wall 34, communicating with conduit 72 which is connected by suitable tubing to reservoir means (not shown) for collecting the filtered water.

Changes may be made in the filtering system as illustrated and described without departing from the scope of the invention. For example, orifice 27, which essentially maintains the line pressure therein, may be positioned other than in nipple 22, which may be threaded, but is between faucet 10 and tube 40 to provide an low water pressure within and relatively slow flow rate through apparatus 26. Control of the flow rate could in most cases be controlled simply by opening the faucet valve to only a slight degree, but it is preferred that no such control requirements be placed upon the user of the system, permitting the faucet to be opened up to the maximum extent and the line pressure reduced by the flow restriction. The pressure within apparatus 26 when in operation is obviously lower than in the main line pressure if outlet diameters of inlet and outlets in the apparatus exceed the orifice 27 diameter.

Since the only intended use of the filtered water is for drinking and, if desired, cooking purposes, it is advisable to collect only that amount of filtered water as is anticipated to be needed over a short period of time. Although the flow rate through the filter apparatus is relatively slow, the supply may be used fresh directly collected or accumulated in clean containers such as stoppered jugs.

Elements of the system may be fabricated from relatively cheap materials, such as molded plastics. It is preferred that at least lower and upper sections 28 and 32 be of transparent material to permit direct viewing of the filtering materials therein, thus providing a visual indication of the need for replacement of such materials in accordance with the degree of discoloration thereof due to collected impurities removed from the water.

Prior to first use of the apparatus and after replacement of filtering materials, it is advisable by use of the hot water faucet to hot water flush for several minutes or to introduce into tube 20 when disconnected the recommended amount of an approved chemical sanitizer followed by flushing.

What is claimed is:

1. A water filter system for attachment to a faucet from which water is supplied at a first pressure, said filter system comprising:
   (a) at least two interconnected, enclosed sections arranged vertically to provide upper and lower sections;
   (b) a line arranged to receive water from said faucet and to discharge through an end portion arranged within said lower section near the bottom thereof;
   (c) flow restricting means arranged between said faucet and said end portion of said line to reduce the water pressure from said first pressure at said faucet to a second pressure when discharged into said lower section;
   (d) first and second filter materials arranged within said lower and upper sections, respectively, for removing or reducing particulate matter or other foreign substances or contaminants from water flowing therethrough, each of said first and second filter materials comprising a plurality of nested, cup-shaped, paper filter elements;
   (e) an impermeable wall separating said lower and upper sections;
   (f) aperture means through which water may flow from said lower to said upper section; and
   (g) means adjacent the top of said upper section through which water exits said filter system after passing through said first and second filter means.

2. The invention according to claim 1 wherein said lower and upper sections are cylindrical in shape and of equal diameter.

3. The invention according to claim 2 wherein said lower and upper sections are interconnected by a threaded collar encircling adjacent portions of said sections.

4. The invention according to claim 3 wherein said impermeable wall is formed integrally with said collar.

5. The invention according to claim 4 wherein said aperture means are substantially centrally disposed in said wall.

6. The invention according to claim 1 and further including means for sealing said filter elements about the periphery thereof to the interior surfaces of said upper and lower sections to insure that all water flowing through said sections passes through said filter elements.

7. The invention according to claim 6 wherein said sealing means comprise a pair of rings, one disposed within each of said sections, and dimensioned to fit within said sections with the peripheries of said filter elements tightly engaged between said rings and the interior surfaces of said sections.

8. The invention according to claim 7 wherein each of said first and second filter materials include a filter material in addition to and distinct from said paper filter elements.

9. The invention according to claim 1 wherein said line comprises a length of flexible tubing connected at one end to receive water from said faucet, and said flow restricting means comprises an orifice positioned adjacent said one end.

10. The invention according to claim 1 wherein said upper and lower sections are of transparent material to permit direct viewing of said white-like filter material, thereby providing a visual indication of the need for replacement of said filter material by the degree of discoloration thereof.

* * * * *